(12) United States Patent
Kim et al.

(10) Patent No.: US 9,356,262 B2
(45) Date of Patent: May 31, 2016

(54) BATTERY PACK

(75) Inventors: Jae-Seung Kim, Yongin-si (KR); Kyung-Ho Park, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 392 days.

(21) Appl. No.: 13/404,500

(22) Filed: Feb. 24, 2012

(65) Prior Publication Data

US 2013/0059171 A1  Mar. 7, 2013

(30) Foreign Application Priority Data

Sep. 1, 2011 (KR) ........................ 10-2011-0088528

(51) Int. Cl.
  *H01M 2/02* (2006.01)
  *H01M 2/04* (2006.01)
  *H01M 2/34* (2006.01)
  *H01M 10/42* (2006.01)

(52) U.S. Cl.
  CPC .............. *H01M 2/0404* (2013.01); *H01M 2/34* (2013.01); *H01M 10/4257* (2013.01)

(58) Field of Classification Search
  CPC .. H01M 2/0404; H01M 2/34; H01M 10/4257
  USPC ............................................................ 429/7
  See application file for complete search history.

(56) References Cited

U.S. PATENT DOCUMENTS

| 7,887,949 | B2 | 2/2011 | Yoon | |
| 2006/0091851 | A1* | 5/2006 | Kim | H01M 2/1066 320/112 |
| 2006/0266542 | A1 | 11/2006 | Yoon | |
| 2009/0081485 | A1 | 3/2009 | Heo | |
| 2010/0092859 | A1 | 4/2010 | Kim et al. | |
| 2010/0203374 | A1 | 8/2010 | Kano | |
| 2011/0123836 | A1 | 5/2011 | Jang | |
| 2011/0250475 | A1* | 10/2011 | Yamamoto et al. | ............... 429/7 |

FOREIGN PATENT DOCUMENTS

| JP | 2002-124233 A | | 4/2002 |
| JP | 2008-021507 A | | 1/2008 |
| JP | 2011082136 A | * | 4/2011 |
| KR | 10-2006-0113802 A | | 11/2006 |
| KR | 10-2008-0064917 A | | 7/2008 |
| KR | 10-2009-0031158 A | | 3/2009 |

OTHER PUBLICATIONS

Korean Office Action issued by Korean Patent Office on Dec. 20, 2012 corresponding to Korean Patent Application No. 10-2011-0088528 and Request for Entry of the Accompanying Office Action attached herewith.
Korean OA issued by the KIPO on Sep. 25, 2013 in the examination of Korean Patent Application No. 10-2013-0088243, which corresponds to KR 10-2011-0088528 and Request for Entry of the Accompanying Office Action attached herewith.

* cited by examiner

*Primary Examiner* — Jonathan Jelsma
(74) *Attorney, Agent, or Firm* — Robert E. Bushnell, Esq.

(57) ABSTRACT

A battery pack having a battery cell. The battery cell includes a terrace portion, a protection circuit module that is electrically connected to the battery cell and is placed on the terrace portion, and a frame that houses the battery cell and the protection circuit module and covers at least the protection circuit module.

15 Claims, 9 Drawing Sheets

BATTERY PACK

CLAIM OF PRIORITY

This application makes reference to, incorporates the same herein, and claims all benefits accruing under 35 U.S.C. §119 from an application earlier filed in the Korean Intellectual Property Office on 1 Sep. 2011 and there duly assigned Serial No. 10-2011-0088528.

BACKGROUND OF THE INVENTION

1. Field of the Invention

The present invention generally relates to a battery pack.

2. Description of the Related Art

With recent rapid developments in electronic, communications, and computer industries, camcorders, mobile phones, notebook computers, tablet PCs, etc. are widely used. Therefore, a demand for high-performance secondary batteries that are lightweight, have long lifetimes, and are highly reliable is increasing. For example, lithium secondary batteries receive much attention and an application range thereof is ever widening.

A battery pack is used in either a hard pack form in which an exterior case is used to protect a bare cell and a safety device cell or an inner pack form in which a gap between a bare cell and a protection circuit substrate is filled with a hot melted resin and tubing or labeling is performed using a thin exterior material.

A lithium secondary battery can be categorized as, according to the type of an electrolyte included therein, a lithium metal or ion battery using an organic solvent electrolyte or a lithium polymer battery using a solid polymer electrolyte. According to the shape of a can housing an electrode assembly and an electrolytic solution, a lithium secondary battery can also be categorized as a circular lithium secondary battery, a rectangular lithium secondary battery, or a pouch-shaped lithium secondary battery.

In general, a lithium polymer battery using a solid polymer electrolyte has a pouch-like outer shape, and a lithium ion battery using an organic solvent electrolyte has a circular or rectangular outer shape.

The above information disclosed in this Related Art section is only for enhancement of understanding of the background of the invention and therefore it may contain information that does not form the prior art that is already known to a person of ordinary skill in the art.

SUMMARY OF THE INVENTION

One or more embodiments of the present invention include a battery pack having reinforced structural rigidity.

Additional aspects will be set forth in part in the description which follows and, in part, will be apparent from the description, or may be learned by practice of the presented embodiments.

According to one or more embodiments of the present invention, a battery pack includes: a battery cell including a terrace portion; a protection circuit module that is electrically connected to the battery cell and is placed on the terrace portion; and a frame that houses the battery cell and the protection circuit module and covers at least the protection circuit module.

The frame may further include: an edge frame portion surrounding the battery cell and the protection circuit module; and a first extension portion extending from a side of the edge frame portion adjacent to the terrace portion toward the protection circuit module.

The frame may further include a second extension portion that is disposed facing the first extension portion and covers the terrace portion.

The battery pack may further include an insulating tape that is disposed between the terrace portion and the protection circuit module and covers a surface of the protection circuit module.

The protection circuit module may further include a cable for electrically connecting the battery pack to an external device, and the frame has a through-hole that is formed corresponding to the cable to guide the cable to the outside of the battery pack.

The frame may include an insulating material.

The battery cell may be a pouch cell.

The protection circuit module may be disposed on the terrace portion in such a way that a circuit device mounted on the protection circuit module faces the terrace portion.

The battery pack may further include a fixing portion that contacts at least a portion of the battery cell to prevent separation of the battery cell from the frame.

The battery pack may further include an exterior label that is attached to the frame and the battery cell and surrounds the frame and the battery cell.

According to one or more embodiments of the present invention, a battery pack includes: an assembly including a battery cell including a terrace portion and a protection circuit module that is electrically connected to the battery cell and is placed on the terrace portion; and a frame that houses the battery cell and the protection circuit module and covers at least the protection circuit module.

The battery pack may include: an edge frame portion surrounding the assembly; a first extension portion extending from a side of the edge frame portion adjacent to the terrace portion toward the protection circuit module; and a second extension portion that is disposed facing the first extension portion and covers the terrace portion.

The battery pack may further include a fixing portion that is flush with the first extension portion or the second extension portion and contacts at least a portion of the assembly.

The fixing portion may include: a first fixing portion that is disposed perpendicular to the edge frame portion and extends in a direction perpendicular to a lengthwise direction of the terrace portion; and a second fixing portion that is disposed perpendicular to the edge frame portion and extends in parallel to the first fixing portion.

The battery pack may further include an insulating tape that is disposed between the terrace portion and the protection circuit module.

The insulating tape may cover a surface of the protection circuit module that faces the terrace portion.

The protection circuit module may be disposed on the terrace portion in such a way that a circuit device mounted on the protection circuit module faces the terrace portion.

The protection circuit module may further include a cable for electrically connecting the battery pack to an external device, and the frame has a through-hole that is formed corresponding to the cable to guide the cable to the outside of the battery pack.

The frame may include an insulating material.

The battery cell may be a pouch cell.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
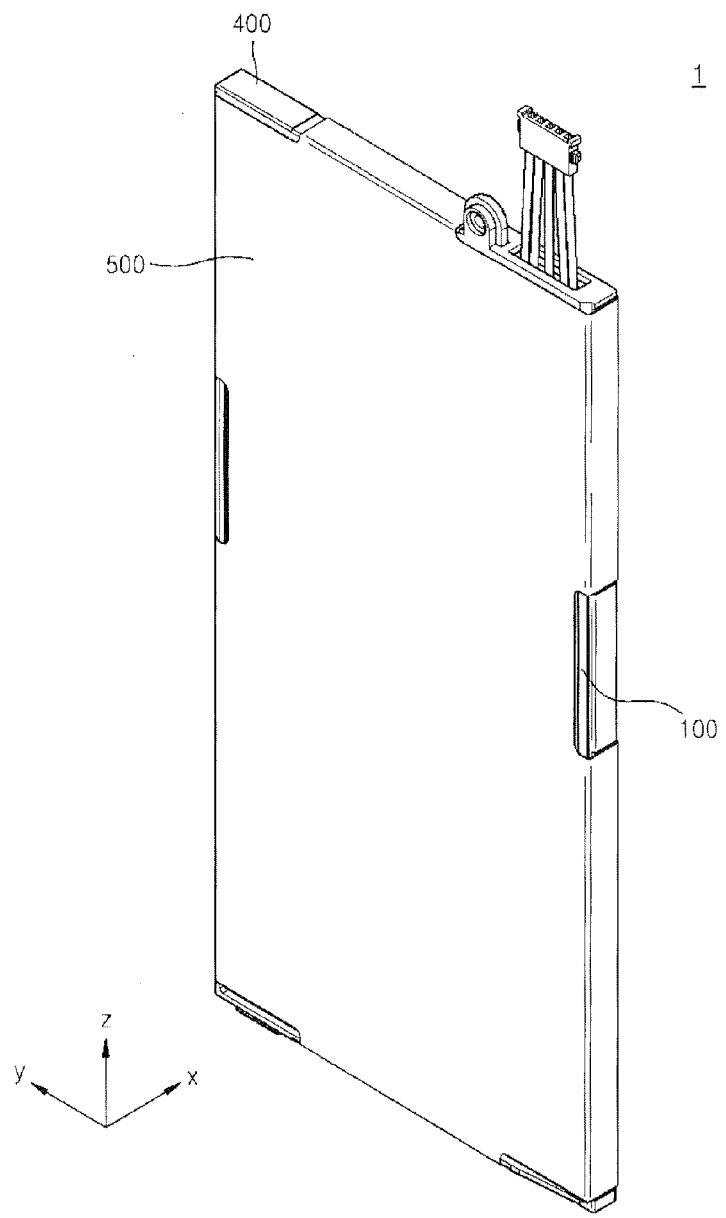
FIG. 1 is a perspective view of a battery pack according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

The merits and characteristics of the present invention, and methods for accomplishing them may be obvious in view of embodiments described in detail with reference to the attached drawings. However, the present invention is not limited to the following embodiments, and may have different forms and should not be construed as being limited to the descriptions set forth herein. While this invention has been particularly shown and described with reference to embodiments thereof, it will be understood by those skilled in the art that various changes in form and details may be made therein without departing from the spirit and scope of the invention as defined by the appended claims. The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated elements, steps, operations, and/or devices, but do not preclude the presence or addition of one or more other elements, steps, operations, and/or devices. It will also be understood that, although the terms first, second, etc. may be used herein to describe various elements, these elements should not be limited by these terms. These terms are only used to distinguish one element from another.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Figure 2:
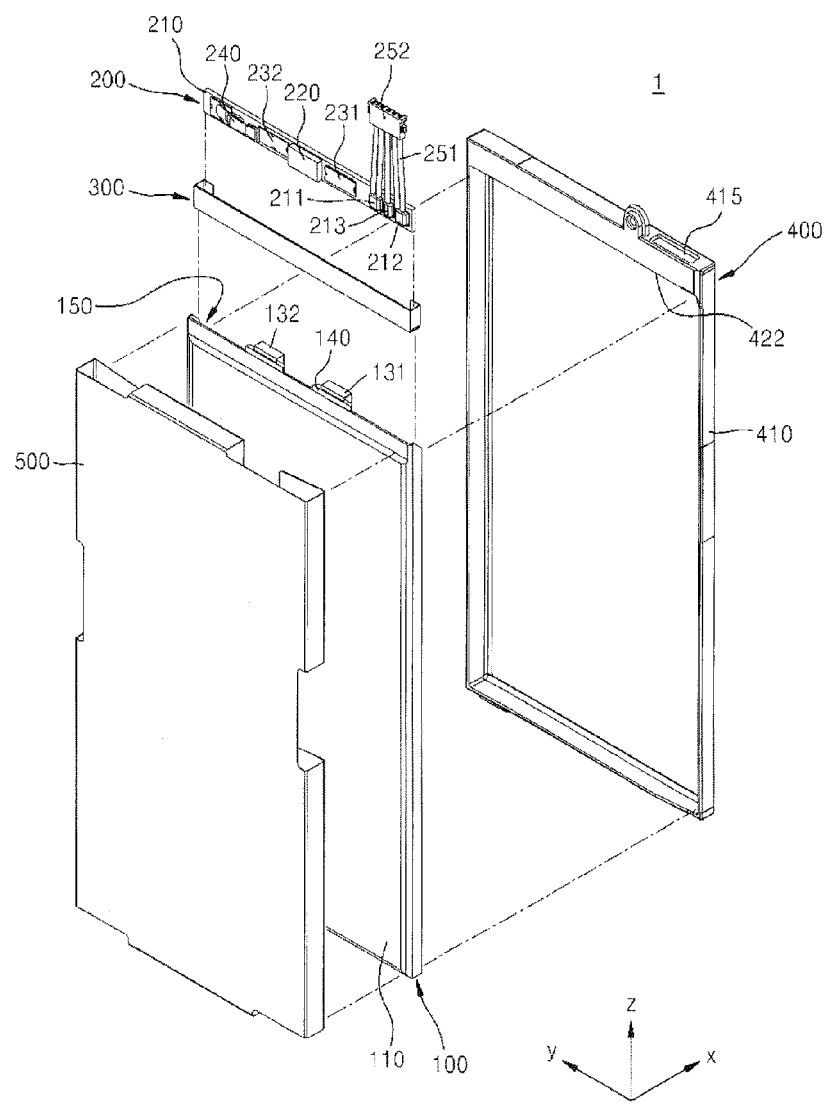
FIG. 2 is an exploded perspective view of the battery pack of FIG. 1.

FIG. 1 is a perspective view of a battery pack 1 according to an exemplary embodiment of the present invention, and FIG. 2 is an exploded perspective view of the battery pack 1 of FIG. 1.

Referring to FIGS. 1 and 2, the battery pack 1 according to the present embodiment may include a battery cell 100, a protection circuit module 200, an insulating tape 300, a frame 400, and an exterior label 500.

The battery cell 100 may be a pouch cell, and includes an exterior element 110 having a pouch type and a positive electrode tab 131 and a negative electrode tab 132 extending from the exterior element 110. The battery cell 100 may be, for example, a lithium ion polymer battery. An upper portion of the battery cell 100 may include a terrace portion 150 and both sides of the battery cell 100 may be bent. The positive electrode tab 131 and the negative electrode tab 132 may each be surrounded by an adhesive tab tape 140 to improve sealing and electrical insulating functions with respect to the exterior element 110.

The protection circuit module 200 may be placed on the terrace portion 150, and is electrically connected to the battery cell 100 to prevent overheating and explosions caused by overcharge, overdischarge, or excessive current of the battery cell 100.

The protection circuit module 200 may include a circuit substrate 210, and a circuit device 220 mounted on the circuit substrate 210, a positive electrode lead tab 231, a negative electrode lead tab 232, a safety device 240, and a cable 251. The circuit device 220, the positive electrode and negative electrode lead tabs 231 and 232, the safety device 240, and the cable 251 may all be disposed on a surface of the circuit substrate 210.

The positive electrode lead tab 231 and the negative electrode lead tab 232 may be disposed on the surface of the circuit substrate 210 for electrical connection with the battery cell 100. The positive electrode lead tab 231 may be electrically connected to the positive electrode tab 131 of the battery cell 100 by welding and the negative electrode lead tab 232 is electrically connected to the negative electrode tab 132 of the battery cell 100 by welding.

The circuit substrate 210 may include a charge and discharge circuit pattern (not shown) that controls charge and discharge of the battery cell 100 to make uniform a charge state, or a protection circuit pattern (not shown) for preventing overcharge or overdischarge. The circuit device 220 may be disposed on the surface of the circuit substrate 210 to embody the charge and discharge circuit pattern and the protection circuit pattern.

The safety device 240 blocks a current if the temperature of the battery cell 100 is equal to or higher than an allowable temperature, thereby preventing abnormal incidents caused by heating of the battery cell 100. An example of the safety device 240 is a positive thermal coefficient (PTC) device.

The cable 251 may be connected to a positive electrode terminal 211 and a negative electrode terminal 212, and may be electrically connected to an external electronic device (for example, a notebook computer, a tablet PC, a charging device, etc.) A portion of the cable 251 may be connected to a ground 213. A connector 252 is an element that allows a plurality of the cables 251 to be easily connected to an external electronic device.

The insulating tape 300 may be disposed between the terrace portion 150 and the protection circuit module 200. For example, the insulating tape 300 may completely cover a side of the protection circuit module 200 on which the circuit device 220, the positive and negative electrode lead tabs 231 and 232, the safety device 240, and the cable 251 are disposed, so that the protection circuit module 200 may be electrically insulated from the terrace portion 150 and is also protected from an outside.

The frame 400 houses the battery cell 100 and the protection circuit module 200. The frame 400 may include an insulating material having a certain level of rigidity. For example, the frame 400 may include a plastic. The frame 400 having a certain level of rigidity protects the battery cell 100 and the protection circuit module 200 from external impacts.

The frame 400 includes an edge frame portion 410 that is roughly tetragonal and a first extension portion (not shown) and a second extension portion 422 extending from a side of the edge frame portion 410. The first extension portion is formed covering the protection circuit module 200 to provide rigidity to surroundings of the protection circuit module 200. Accordingly, even when an impact is applied to the battery pack 1, warping or deformation of the protection circuit module 200 may be prevented. Also, the second extension portion 422 may be formed facing the first extension portion and may cover a surface of the terrace portion 150. Due to the first extension portion and the second extension portion 422, rigidity of the surroundings of the protection circuit module 200 of the battery pack 1 may be enhanced.

The frame 400 may include a through-hole 415 that guides the cable 251 of the protection circuit module 200 to the outside of the battery pack 1. A detailed structure of the frame 400 will be described below with reference to FIGS. 6 to 9.

The exterior label 500 surrounds the battery cell 100 and the frame 400. After an assembly of the protection circuit module 200 and the battery cell 100 is housed in the frame 400, the exterior label 500 may be attached to the assembly. By doing so, the battery pack 1 may have a compact structure and may also be protected from external impacts.

Figure 3:
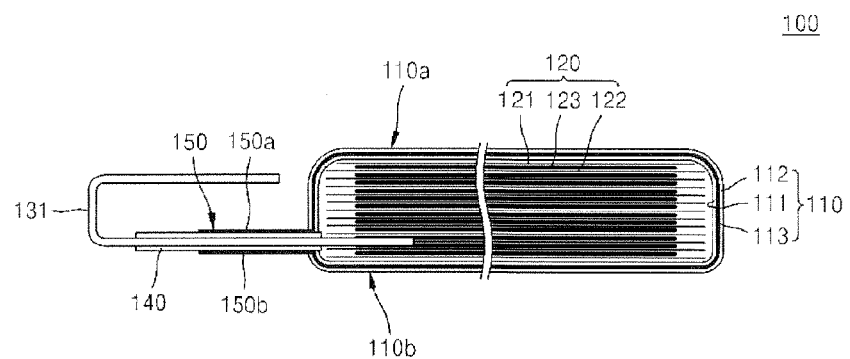
FIG. 3 is a cross-sectional view of a battery cell according to an embodiment of the present invention.

FIG. 3 is a cross-sectional view of the battery cell 100 according to an embodiment of the present invention. In FIG. 3, only the positive electrode tab 131 is illustrated to easily describe the battery cell 100.

Referring to FIG. 3, the battery cell 100 may include the exterior element 110 and an electrode assembly 120 and an electrolyte (not shown) that are housed inside the exterior element 110. The electrode assembly 120 may include a positive electrode plate 121 formed by an application of a positive electrode slurry including a positive electrode active material, a negative electrode plate 122 formed by an application of a negative electrode slurry including a negative electrode active material, and a separator 123 interposed between the positive electrode plate 121 and the negative electrode plate 122.

The positive electrode plate 121 may include a positive electrode coated part, which may be formed by applying the positive electrode slurry to a current collector formed of, for example, aluminum, and a positive electrode uncoated part that is not coated with the positive electrode slurry. The positive electrode slurry may include a positive electrode active material. Examples of the positive electrode active material may be a lithium chalcogenide compound or a lithium-containing transition metal oxide, such as $LiCoO_2$, $LiNiO_2$, $LiMnO_2$, or $LiMnO_4$. For example, the positive electrode uncoated part may be coupled to the positive electrode tab 131 and a portion of the positive electrode tab 131 extends from the exterior element 110 to the outside.

The negative electrode plate 122 may include a negative electrode coated part, which is formed by applying a negative electrode slurry to a current collector formed of, for example, nickel, and a negative electrode uncoated part that is not coated with the negative electrode slurry. The negative electrode slurry may include a negative electrode active material. Examples of the negative electrode active material may be a carbonaceous material, such as crystalline carbon, amorphous carbon, carbon composite, or carbon fiber, a lithium metal, or a lithium alloy. For example, the negative electrode uncoated part may be coupled to the negative electrode tab 132 and a portion of the negative electrode tab 132 may extend from the exterior element 110 to the outside.

The separator 123 may include porous polypropylene (PP) or porous polyethylene (PE) to allow lithium ions to migrate freely between the positive electrode plate 121 and the negative electrode plate 122.

The exterior element 110 that is a pouch type may include a metallic film foil 111, and insulating layers 112 and 113 disposed on upper and lower surfaces of the metallic film 111. For example, the metallic film 111 may include aluminum, stainless steel, or the like.

A lower surface 150*b* of the terrace portion 150 is substantially integrally formed as one body with a lower surface 110*b* of the exterior element 110, and an upper surface 150*a* of the terrace portion 150 is disposed at a level lower than an upper surface 110*a* of the exterior element 110. Accordingly, the terrace portion 150 has a sufficiently wide space for allowing the protection circuit module 200 to be placed thereon.

Figure 4:
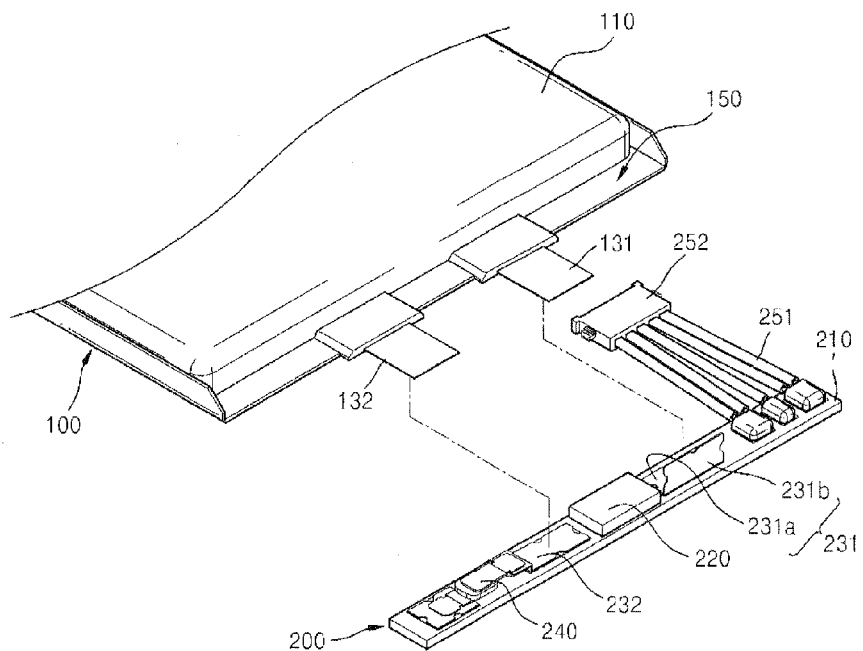
FIG. 4 is an exploded perspective view of a battery cell and a protection circuit module, according to an embodiment of the present invention.
Figure 5:
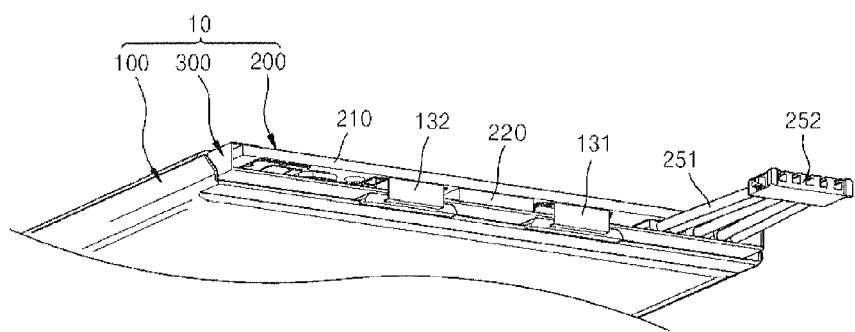
FIG. 5 is a perspective view illustrating an assembled state of the battery cell and the protection circuit module of FIG. 4.

FIG. 4 is a perspective view illustrating the battery cell 100 and the protection circuit module 200 before they are coupled according to an embodiment of the present invention, and FIG. 5 is a perspective view of an assembly 10 of the battery cell 100 and the protection circuit module 200 illustrated in FIG. 4, in which the protection circuit module 200 is placed on the terrace portion 150 of the battery cell 100.

Referring to FIG. 4, the positive and negative electrode tabs 131 and 132 of the battery cell 100 extend straightly from the exterior element 110 and are electrically connected to the positive and negative electrode lead tabs 231 and 232 of the protection circuit module 200. The negative electrode lead tab 232 may be connected to the negative electrode tab 132 of the battery cell 100 by welding, and the positive electrode lead tab 231 formed on a surface of the protection circuit module 200 may be connected to the positive electrode tab 131 of the battery cell 100 by welding.

Originally, the positive electrode lead tab 231 has first and second surfaces 231*a* and 231*b* that form an L-shape. However, when the positive electrode tab 131 is welded to the first surface 231a, the second surface 231b is bent onto the positive electrode tab 131. Accordingly, the first and second surfaces 231a and 231b of the positive electrode lead tab 231 may form a sandwich shape with the positive electrode tab 131 of the battery cell 100 interposed therebetween.

After the positive and negative electrode tabs 131 and 132 of the battery cell 100 are welded to the positive and negative electrode lead tabs 231 and 232 of the protection circuit module 200, the protection circuit module 200 may be placed on the terrace portion 150 of the battery cell 100.

Before the protection circuit module 200 is placed on the terrace portion 150, the insulating tape 300 may be disposed covering the surface of the protection circuit module 200 on which the circuit device 220 of the protection circuit module 200 is formed. To place the protection circuit module 200 on the terrace portion 150, the positive and negative electrode tabs 131 and 132 of the battery cell 100 are bent twice, thereby completing manufacturing of the assembly 10 illustrated in FIG. 5.

Referring to FIG. 5, the surface of the protection circuit module 200 on which the circuit device 220, the safety device 240, and the cable 251 are disposed faces the terrace portion 150. Because the surface of the protection circuit module 200 on which the circuit device 220, the safety device 240, and the cable 251 are disposed is covered by the insulating tape 300, and faces the terrace portion 150, the protection circuit module 200 may be double-protected from the outside.

After the assembly 10 of the battery cell 100 and the protection circuit module 200 is completed, the assembly 10 may be inserted into and fixed on the frame 400.

In the present embodiment, the positive electrode lead tab 231 has an L-shape. However, the shape of the positive electrode lead tab 231 is not limited thereto and, for example, the negative electrode lead tab 232 may have the L-shape. Also, the locations of the positive electrode lead tab 231 and the negative electrode lead tab 232 may be switched.

Figure 6:
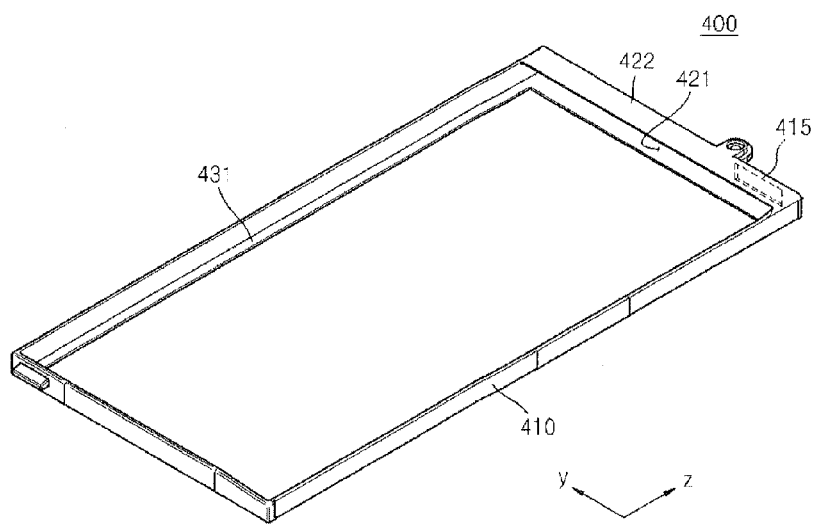
FIG. 6 is a perspective view of a frame according to an embodiment of the present invention.
Figure 7:
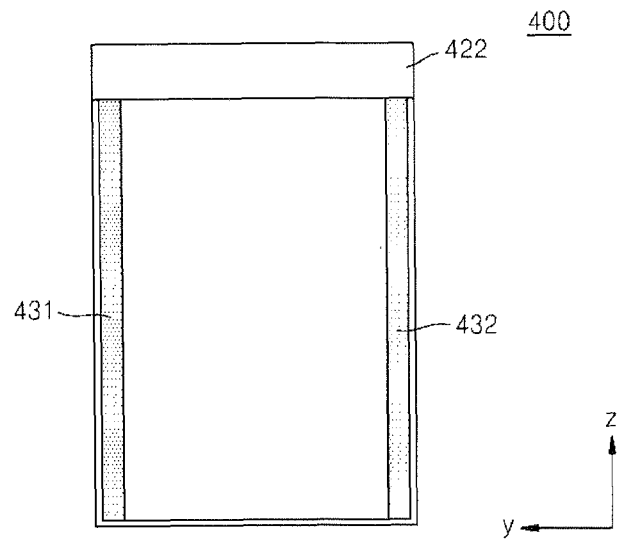
FIG. 7 is a front view of the frame of FIG. 6.

FIG. 6 is a perspective view of the frame 400 according to an embodiment of the present invention, and FIG. 7 is a front view of the frame 400 of FIG. 6.

Referring to FIGS. 6 and 7, the frame 400 may have a tetragonal shape surrounding the assembly 10 and may include an edge frame portion 410, a first extension portion 421 and the second extension portion 422, and first and second fixing portions 431 and 432. The frame 400 is formed separately. For example, the frame 400 may be formed by a molding method using a resin. A hot melt resin may be filled in a mold and then cooled in order to form the frame 400. As such, since the frame 400 is formed separately and then the battery cell 100/battery assembly 10 is inserted into the frame 400 (see FIG. 10), the battery cell 100 is not damaged by heat of the hot melt resin.

The edge frame portion 410 surrounds the assembly 10. On a side of the edge frame portion 410, the through-hole 415 is formed to guide the cable 251 to the outside therethrough.

The first and second extension portions 421 and 422 may be disposed on a side of the edge frame portion 410 corresponding to the terrace portion 150. The first extension portion 421 and second extension portion 422 may be disposed facing each other, and each of the first and second extension portions 421 and 422 may have substantially the same width and length as those of the terrace portion 150. The protection circuit module 200 may be housed in a space between the first and second extension portions 421 and 422. Because one surface of the protection circuit module 200 is covered by the first extension portion 421 and another surface of the protection circuit module 200 is covered by the terrace portion 150 and/or the second extension portion 422, the protection circuit module 200 is not exposed to the outside. Also, because the terrace portion 150 and the first and second extension portions 421 and 422 have certain levels of rigidity, they protect the protection circuit module 200 from external impacts. Accordingly, bending or deformation of the protection circuit module 200 may be preventable.

The first and second fixing portions 431 and 432 may be flush with the first extension portion 421 and may be substantially perpendicular to the edge frame portion 410. The first and second fixing portions 431 and 432 disposed in parallel may extend in a direction roughly perpendicular to a lengthwise direction of the first extension portion 421 and/or the second extension portion 422.

To prevent separation of the assembly 10 from the frame 400 when the assembly 10 is coupled to the frame 400, the first and second fixing portions 431 and 432 support the battery cell 100 while in contact with a portion of the battery cell 100.

Figure 8:
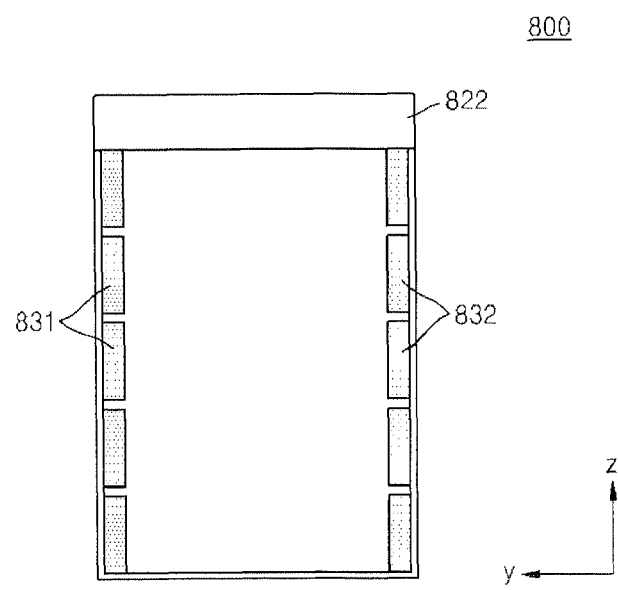
FIGS. 8 and 9 are front views of frames according to other embodiments of the present invention.
Figure 9:
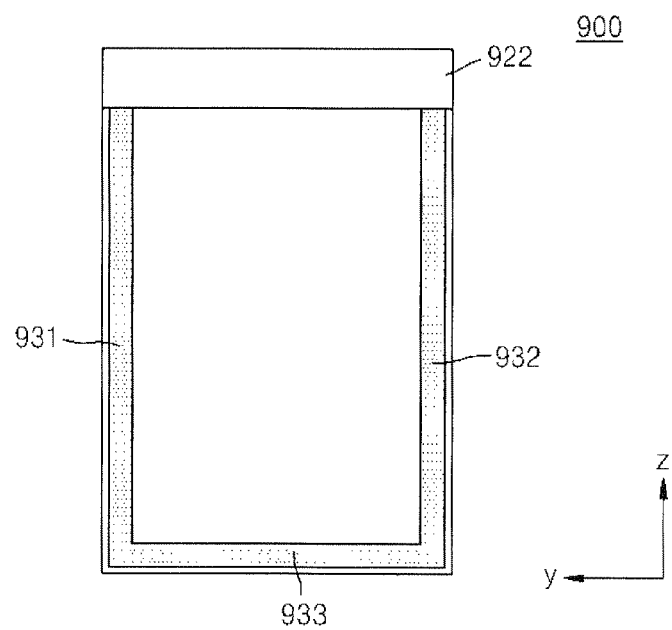

FIGS. 8 and 9 are front views of frames 800 and 900 according to other embodiments of the present invention.

As another embodiment, referring to FIG. 8, a first fixing portion 831 and a second fixing portion 832 may be flush with a first extension portion (not shown) and extend intermittently in a direction roughly perpendicular to a lengthwise direction of the first extension portion (or a second extension portion 822). The first and second fixing portions 831 and 832 according to the present embodiment also support the battery cell 100 to prevent separation of an assembly from the frame 800.

As another embodiment, referring to FIG. 9, the frame 900 may include first, second, and third fixing portions 931, 932, and 933 that may be flush with a first extension portion (not shown). The first and second fixing portions 931 and 932 may extend in a direction roughly perpendicular to a lengthwise direction of a second extension portion 922 (or a first extension portion) and may be disposed in parallel, and the third fixing portion 933 may be flush with the first and second fixing portions 931 and 932 and may extend parallel to the lengthwise direction of the first extension portion. Like the previous embodiments, in the present embodiment, because the first, second, and third fixing portions 931, 932, and 933 support the battery cell 100, separation of an assembly from the frame 900 may be prevented.

Figure 10:
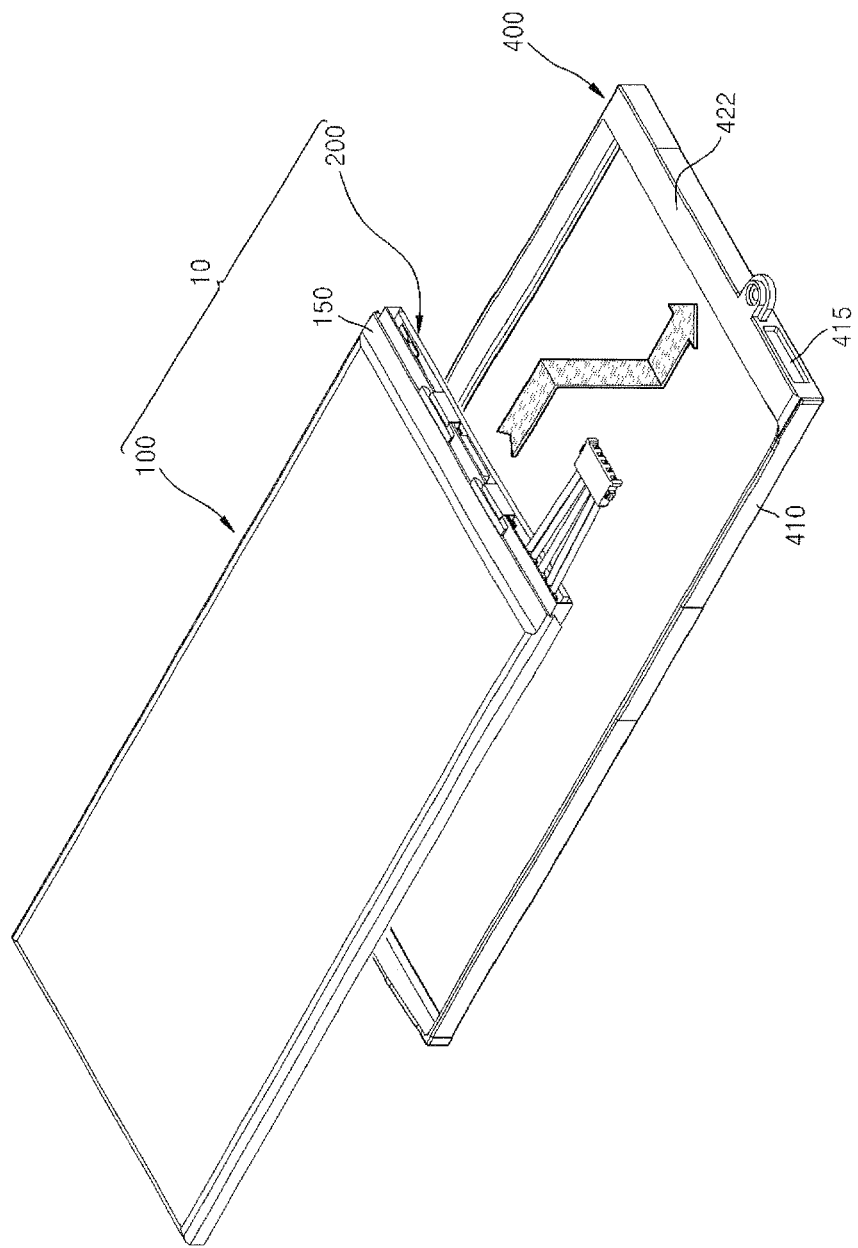
FIGS. 10 and 11 are perspective views for explaining how an assembly of a battery cell and a protection circuit module is coupled to a frame.
Figure 11:
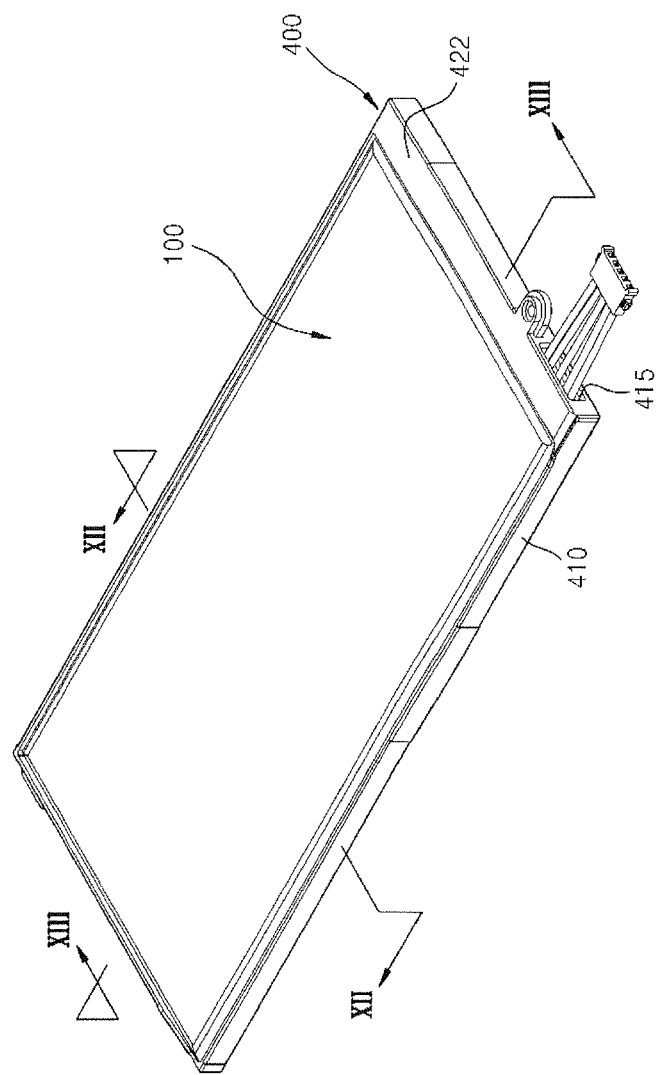
Figure 12:
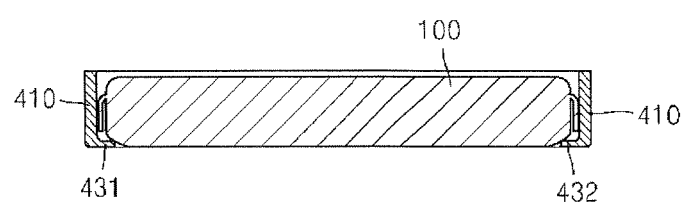
FIG. 12 is a cross-sectional view taken along a line X II-X II of FIG. 11.
Figure 13:
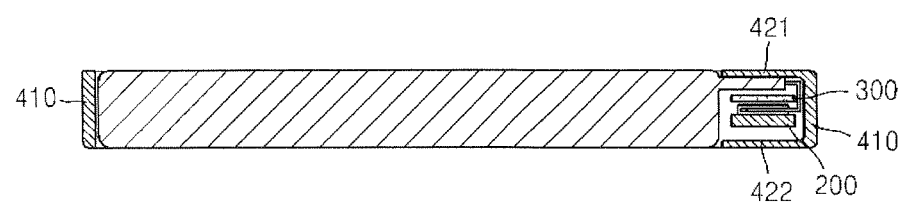
FIG. 13 is a cross-sectional view taken along a line X III-X III of FIG. 11.

FIGS. 10 and 11 are perspective views for explaining how the assembly 10 of the battery cell 100 and the protection circuit module 200 is coupled to the frame 400, FIG. 12 is a cross-sectional view taken along a line X II-X II of FIG. 11, and FIG. 13 is a cross-sectional view taken along a line X III-X III of FIG. 11.

Referring to FIG. 10, an end of the assembly 10 of the battery cell 100 and the protection circuit module 200 described with reference to FIGS. 4 and 5 is inserted into the space formed between the first and second extension portions 421 and 422 of the frame 400. In this regard, the end of the assembly 10 inserted into the first and second extension portions 421 and 422 refers to a portion of the assembly 10 where the terrace portion 150 on which the protection circuit module 200 is placed is present. First, the end of the assembly 10 is obliquely inserted into the frame 400 in such a way that the cable 251 passes through the through-hole 415 of the frame 400.

Then, another end of the assembly 10 may be inserted into the frame 400. As a result, as illustrated in FIG. 11, the assembly 10 is housed in the frame 400.

Referring to FIGS. 12 and 13, the frame 400 may be disposed housing and surrounding the assembly 10 to improve structural rigidity of the battery pack 1, and because the first and second fixing portions 431 and 432 support the battery cell 100, separation of the assembly 10 from the frame 400 may be preventable.

Because the constituents of the protection circuit module 200 are disposed facing the terrace portion 150 of the battery cell 100, the first extension portion 421 of the frame 400 having a certain level of rigidity covers a surface of the protection circuit module 200, the terrace portion 150 covers another surface of the protection circuit module 200, and the second extension portion 422 covers the terrace portion 150, bending of the protection circuit module 200 may be preventable.

If the protection circuit module 200 is bent or deformed due to an external impact, power of the battery pack 1 may be reduced. However, according to an embodiment of the present invention, due to the inclusion of the frame 400 described above, the structural rigidity of the battery pack 1 is improved and deformation of the protection circuit module 200 may be prevented.

The first and second fixing portions 431 and 432 are formed on the same plane, so that the assembly 10/the battery cell 100 is inserted and fit into the frame 400. For example, the first and second fixing portions 431 and 432 are flush with the first extension portion 421. If the first fixing portion 431 is flush with the first extension portion 421 and the second fixing portion 432 is flush with the second extension portion 422, the assembly 10/the battery cell 100 is not inserted into the frame 400.

As described above, the first and second fixing portions 431 and 432 are flush with the first extension portion 421. However, the present invention is not limited thereto. For example, the first and second fixing portions 431 and 432 may instead be flush with the second extension portion 422. In this case, however, the assembly 10 is inserted into the frame 400 in a different direction. For example, referring to FIG. 11, the frame 400 is disposed in such a way that the first extension portion 421 is disposed at a higher level than the second extension portion 422 and then the assembly 10 is inserted into the frame 400.

As described above, according to the one or more of the above embodiments of the present invention, due to the housing of a battery cell and a protection circuit module and the inclusion of a frame that covers a terrace portion of the battery cell when the protection circuit module is disposed on the terrace portion, the structural rigidity of the battery pack may be improved.

Accordingly, the battery cell and the protection circuit module may be protected from external impacts, and also bending of the protection circuit module is prevented, thereby preventing power loss resulting from deformation of the protection circuit module.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery pack comprising:
    a battery cell including a terrace portion;
    a protection circuit module electrically connected to the battery cell and placed on the terrace portion; and
    a frame that houses the battery cell and the protection circuit module and covers at least the protection circuit module,
    wherein the frame includes an insulating material, and the frame is a hexahedron including an upper surface, a bottom surface, and sides between the upper and bottom surfaces,
    wherein the frame comprises:
    an edge frame portion corresponding to the sides and surrounding the battery cell and the protection circuit module,
    a fixing portion corresponding to the bottom surface and contacts at least a portion of the battery cell to prevent separation of the battery cell from the frame, said fixing portion extends perpendicularly from one side of the edge frame portion and extends in a direction perpendicular to a lengthwise direction of the terrace portion;
    a first extension portion corresponding to the bottom surface extending from a side of the edge frame portion adjacent to the terrace portion toward the protection circuit module; and
    a second extension portion corresponding to the upper surface and facing the first extension portion;
    wherein one of the first and second extension portions is adjacent to the terrace portion toward the protection circuit module, and another of the first and second extension portions covers the terrace portion,
    wherein the fixing portion is in a same plane and is flush with the first extension portion, and contacts at least a portion of the battery cell, and
    wherein the upper surface of the frame is open and only includes the second extension portion to prevent separation of the battery cell from the frame, after the battery cell is inserted through the upper surface into the frame between the first and second extensions, a portion of the battery cell makes direct contact with one of the first or second extensions, the protection circuit module is parallel with the first and second extensions, and the portion of the battery cell is between the protection circuit module and the one of the first or second extensions.

2. The battery pack of claim 1, further comprising an insulating tape that is disposed between the terrace portion and the protection circuit module and covers a surface of the protection circuit module.

3. The battery pack of claim 1, wherein the protection circuit module further comprises a cable for electrically connecting the battery pack to an external device, and
    the frame has a through-hole that is formed corresponding to the cable to guide the cable to the outside of the battery pack.

4. The battery pack of claim 1, wherein the battery cell is a pouch cell and the battery cell is inserted and fit into the frame.

5. The battery pack of claim 1, wherein the protection circuit module is disposed on the terrace portion in such a way that a circuit device mounted on the protection circuit module faces the terrace portion.

6. The battery pack of claim 1, further comprising an exterior label that is attached to the frame and the battery cell and surrounds the frame and the battery cell.

7. A battery pack having a battery cell with an assembly, said battery cell comprising:
    an assembly comprising a battery cell comprising a terrace and a protection circuit module electrically connected to the battery cell and placed on the terrace portion; and
    a frame is a rectangular prism that includes an upper surface, a bottom surface, and four sides, the four sides are located between the upper and bottom surfaces, wherein a frame housing the assembly, comprising:
- an edge frame portion corresponding to the four sides and surrounding the assembly;
- a first extension portion correspond to the bottom surface and extending from a side of the edge frame portion adjacent to the terrace portion toward the protection circuit module and facing the protection circuit module to cover the protection circuit module;
- a fixing portion that is in a same plane and is flush with the first extension portion and contacts at least a portion of a bottom surface of the assembly, said fixing portion extends perpendicularly from one side of the edge frame portion and extends in a direction perpendicular to a lengthwise direction of the terrace portion; and
- a second extension portion corresponding to the upper surface, wherein the upper surface of the frame is open and only includes the second extension portion to prevent separation of the battery cell from the frame, after the battery is inserted through the upper surface and into the frame between the first and second extensions, a portion of the assembly makes direct contact with one of the first or second extensions, the protection circuit module is parallel with the first and second extensions, and the portion of the assembly is between the protection circuit module and the one of the first or second extensions.

8. The battery pack of claim 7, wherein the frame further comprises:
a second extension portion disposed facing the first extension portion and covers the terrace portion.

9. The battery pack of claim 7, wherein the fixing portion comprises:
- a first fixing portion disposed perpendicular to the edge frame portion and extends in a direction perpendicular to a lengthwise direction of the terrace portion; and
- a second fixing portion disposed perpendicular to the edge frame portion and extends in parallel to the first fixing portion.

10. The battery pack of claim 7, further comprising an insulating tape disposed between the terrace portion and the protection circuit module.

11. The battery pack of claim 10, wherein the insulating tape covers a surface of the protection circuit module that faces the terrace portion.

12. The battery pack of claim 7, wherein the protection circuit module is disposed on the terrace portion so that a circuit device mounted on the protection circuit module faces the terrace portion.

13. The battery pack of claim 7, wherein the protection circuit module further comprises a cable for electrically connecting the battery pack to an external device, and
the frame has a through-hole that is formed corresponding to the cable to guide the cable to the outside of the battery pack.

14. The battery pack of claim 7, wherein the frame comprises an insulating material.

15. The battery pack of claim 7, wherein the battery cell is a pouch cell.

* * * * *